(12) United States Patent
Kitamura et al.

(10) Patent No.: US 8,681,453 B2  
(45) Date of Patent: Mar. 25, 2014

(54) DISK DRIVING APPARATUS HAVING IMPROVED QUALITY

(71) Applicant: Samsung Electro-Mechanics Japan Advanced Technology Co., Ltd., Shizuoka (JP)

(72) Inventors: Tetsuo Kitamura, Shizuoka (JP); Yuji Omura, Shizuoka (JP); Aikra Suzuki, Shizuoka (JP)

(73) Assignee: Samsung Electro-Mechanics Japan Advanced Technology Co., Ltd., Shizuoka (JP)

( * ) Notice: Subject to any disclaimer, the term of this patent is extended or adjusted under 35 U.S.C. 154(b) by 0 days.

(21) Appl. No.: 14/011,431

(22) Filed: Aug. 27, 2013

(65) Prior Publication Data

US 2013/0342933 A1    Dec. 26, 2013

Related U.S. Application Data

(62) Division of application No. 13/633,393, filed on Oct. 2, 2012, now Pat. No. 8,553,354.

(30) Foreign Application Priority Data

Oct. 4, 2011   (JP) .................................. 2011-220462

(51) Int. Cl.  
*G11B 33/14*   (2006.01)

(52) U.S. Cl.  
USPC ........................... 360/97.17; 384/120; 310/90

(58) Field of Classification Search  
USPC .......... 360/98.07, 99.04, 99.08, 99.11, 97.16, 360/97.17; 384/107, 115, 120, 123, 132; 310/90

See application file for complete search history.

(56) References Cited

U.S. PATENT DOCUMENTS

| | | | |
|---|---|---|---|
| 4,656,545 A * | 4/1987 | Kakuta | 360/97.16 |
| 6,118,620 A * | 9/2000 | Grantz et al. | 360/99.08 |
| 6,147,424 A * | 11/2000 | Gomyo et al. | 310/90 |
| 6,421,201 B1 * | 7/2002 | Khan et al. | 360/97.15 |
| 7,411,762 B2 | 8/2008 | Tamaoka | |
| 7,515,379 B2 | 4/2009 | Tamaoka et al. | |
| 7,518,823 B2 | 4/2009 | Albrecht et al. | |
| 8,284,513 B2 | 10/2012 | Sekii et al. | |
| 8,363,352 B2 | 1/2013 | Kang | |
| 8,553,354 B2 * | 10/2013 | Kitamura et al. | 360/99.08 |
| 2012/0063030 A1 | 3/2012 | Yamada et al. | |

FOREIGN PATENT DOCUMENTS

JP        2003-289646        10/2003

* cited by examiner

*Primary Examiner* — Angel Castro  
(74) *Attorney, Agent, or Firm* — Blank Rome LLP

(57) ABSTRACT

A disk driving apparatus includes a base member, a hub member, and a fluid bearing unit. The base member has a head movement region on which a head unit is to be mounted such that a head portion of the head unit can be moved along the radial direction of a recording face in a reciprocating manner while facing the recording face of a recording disk to be mounted on the hub member, and a recessed housing portion housing the fluid bearing unit such that it surrounds at least a part of a rotor unit supported by the fluid bearing unit. Furthermore, the base member has an inhibiting wall at a boundary between the head movement region and the recessed housing portion so as to prevent a lubricant fluid from migrating toward the recording disk side.

20 Claims, 7 Drawing Sheets

DISK DRIVING APPARATUS HAVING IMPROVED QUALITY

CROSS-REFERENCE TO RELATED APPLICATIONS

This application is a Divisional Application based on U.S. Ser. No. 13/633,393, filed on Oct. 2, 2012, the entire contents of which is incorporated herein by reference.

BACKGROUND OF THE INVENTION

1. Field of the Invention

The present invention relates to a technique for improving a disk driving apparatus, and particularly to a technique for providing a disk driving apparatus having improved quality.

2. Description of the Related Art

In recent years, by providing a fluid dynamic bearing unit, disk driving apparatuses such as HDDs or the like have come to have dramatically improved rotation accuracy. Accompanying this dramatic improvement in the rotation accuracy, there is a demand for such a disk driving apparatus to have higher data density and higher data capacity. For example, with a HDD configured to magnetically store data, a recording disk on which recording tracks are formed is rotated at high speed. With such an arrangement, a magnetic head is configured to execute data reading/writing operations by tracing the recording tracks with a small floating gap between the magnetic head and the recording disk. In order to configure such a HDD with high data density and high data capacity, there is a need to narrow the width of each recording track. Furthermore, as the track width becomes narrower, there is a need to further narrow the gap between the magnetic head and the recording disk. For example, there is a demand to configure the magnetic head and the recording disk with a very small gap of 5 nm or less between them, giving consideration to data reading/writing reliability.

In many cases, such a disk driving apparatus includes a hub member configured to mount a recording disk. The hub member is supported by a base member via a fluid bearing unit. The fluid bearing unit includes a shaft and a shaft housing unit configured to house the shaft. A radial dynamic pressure groove is formed in at least one from among the outer face of the shaft and the inner face of the shaft housing member. By generating dynamic pressure in a lubricant fluid with which a space formed by the radial pressure groove is filled, the fluid bearing unit functions as a bearing. It should be noted that the hub member is connected to the outer face of the shaft (e.g., see Japanese Patent Application Laid Open No. 2003-289646).

With such a disk driving apparatus, in order to allow the hub member to be smoothly rotated relative to the base member via the fluid bearing unit, the hub member and the base member are arranged such that a gap is formed between them. With such an arrangement, the lubricant fluid with which the fluid bearing unit is filled gradually vaporizes into gas at a very low rate with the passage of the operating time of the disk driving apparatus. In some cases, such a gasified lubricant fluid passes through a gap between the internal components such as the fluid bearing unit, hub member, and base member, and leaks into a clean-air space housing a recording disk mounted on the hub member and a recording playback head configured to perform data read/write operations for such a recoding disk. The hub member is configured to be rotated at a high speed in a state in which the recording disk is mounted on it. Thus, the gasified lubricant fluid diffuses outward along the radial direction of the hub member due to airflow generated by the high-speed rotation operation. If the disk driving apparatus is used in this state for a long period of time, e.g., ranging from several months to several years, in some cases, a part of the gas component of the lubricant fluid adheres to the surface of the recording playback head to form a coating layer. If such a coating layer is formed on the surface of the recording playback head as described above, this increases the substantial distance between the recording playback head and the recording disk by the thickness of the coating layer thus formed. As a result, this increases the risk of the occurrence of data read/write error for the recording disk. That is to say, in some cases, this becomes a cause which shortens the life of the disk driving apparatus, i.e., a period of time during which the user can use this disk driving apparatus. Also, this becomes a cause of difficulty in enlarging the data capacity of such a disk driving apparatus.

SUMMARY OF THE INVENTION

The present invention has been made in view of such a situation. Accordingly, it is a general purpose of the present invention to provide a technique for suppressing the adverse effects of a gasified lubricant fluid so as to provide improved reliability, thereby providing a disk driving apparatus having a long life and a large data capacity.

In order to solve the aforementioned problem, a disk driving apparatus according to an embodiment of the present invention relates to a disk driving apparatus comprising a head unit configured to perform at least one from among a data readout operation and a data writing operation for a recording disk. The disk driving apparatus further comprises: a base member; a rotor unit on which the recording disk is to be mounted; and a fluid bearing unit configured to support the rotor unit such that the rotor unit can be rotated relative to the base member, and configured such that the gas-liquid interface of a lubricant fluid with which a bearing portion of the bearing unit is filled communicates with the surface side of the bearing unit. The base member comprises: a head movement region in which the head unit is to be mounted such that a head portion of the head unit can be moved in a reciprocating manner along the radial direction of a recording face with the head portion facing the recording face of the recording disk to be mounted on the rotor unit; and a recessed housing portion configured to house the fluid bearing unit such that it surrounds at least a part of the rotor unit supported by the fluid bearing unit. Furthermore, an inhibiting wall is formed at a boundary between the head movement region and the recessed housing portion so as to prevent the lubricant fluid from migrating toward the recording disk to be mounted on the rotor unit.

With such an embodiment, the inhibiting wall functions as a gas inhibiting boundary between the head movement region and the recessed housing portion, which prevents the lubricant fluid from migrating toward the recording disk side. Thus, such an arrangement is capable of reducing, in a simple manner, the potential for the lubricant fluid to form a coating layer on the head portion of the head unit.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

Figure 1:
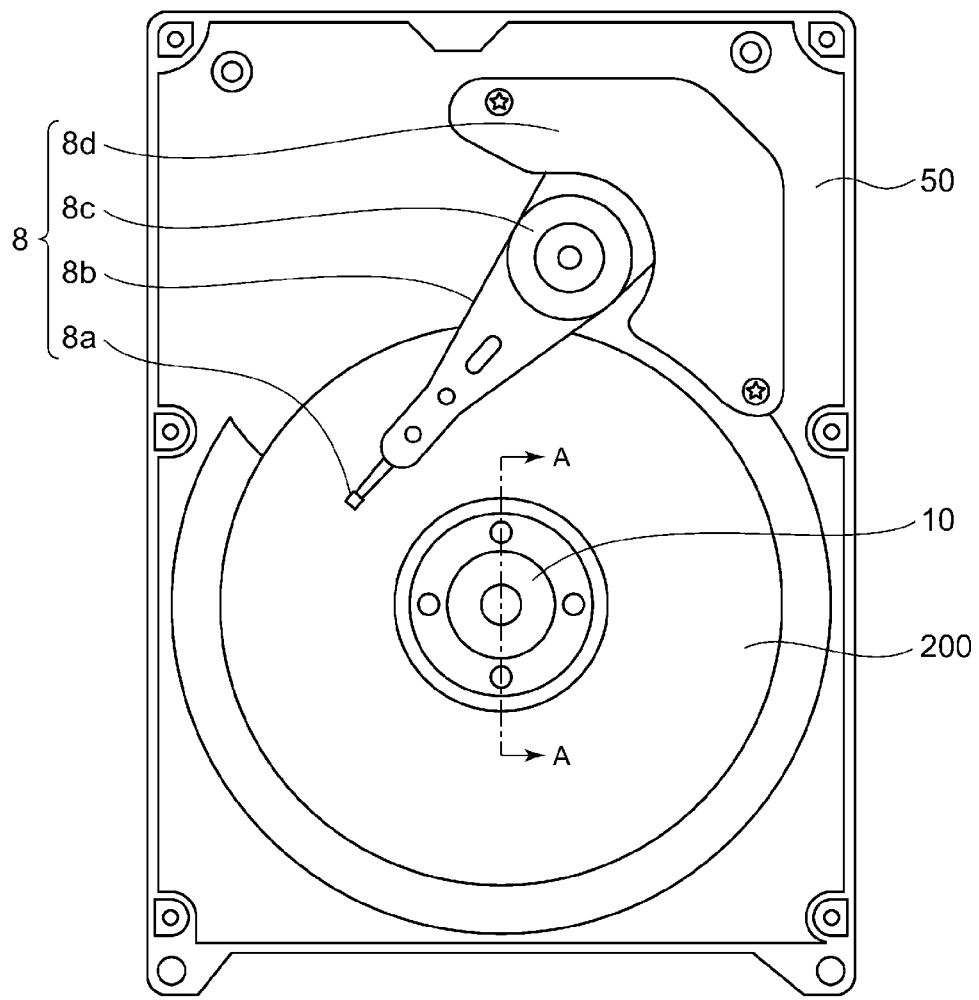
FIG. 1 is an explanatory diagram for describing an internal configuration of a disk driving apparatus according to the present embodiment.

The invention will now be described by reference to the preferred embodiments. This does not intend to limit the scope of the present invention, but to exemplify the invention.

Description will be made regarding a preferred embodiment of the present invention with reference to the drawings. The same or similar components and members are denoted by the same reference numerals, and redundant description thereof will be omitted as appropriate. It should be noted that the scale of the components shown in the drawings is expanded or reduced as appropriate for ease of understanding. Also, a part of the components that are not essential for describing the embodiment are not shown in the drawings.

FIG. 1 is an explanatory diagram for describing an internal configuration of a disk driving apparatus 100 according to the present embodiment. FIG. 1 shows the disk driving apparatus 100 without a top cover in order to show the internal configuration.

The disk driving apparatus 100 includes a base member 50, a hub member 10, a magnetic recording disk 200, a data read/write unit 8, and a top cover (not shown). Description will be made below with the longitudinal direction of the base member 50 as the horizontal direction defined such that the side of the base member 50 on which the hub member 10 is mounted (front side of FIG. 1) is taken to be the upper side.

The recording disk 200 is mounted on the hub member 10, and is rotationally driven according to the rotation operation of the hub member 10. The base member 50 can be formed by molding an aluminum alloy material by means of die casting. The base member 50 is configured to rotatably support the hub member 10 via a fluid bearing unit described later. The data read/write unit 8 configured as a head unit includes a recording playback head 8a, swing arm 8b, pivot assembly 8c, and voice coil motor 8d. The recording playback head 8a is mounted at the end of the swing arm 8b, and is configured to magnetically write data to the recording disk 200 and read out data from the recording disk 200. The pivot assembly 8c is configured to support the swing arm 8b such that the swing arm 8b can be swung around the rotational axis of the head relative to the base member 50. The voice coil motor 8d is configured to swing the swing arm 8b around the rotational axis of the head such that the recording playback head 8a is moved to a desired position above the recording face of the recording disk 200. The data read/write unit 8 is configured using known techniques for controlling the head position. It should be noted that the recording playback head 8a is configured to be moved in a reciprocating manner along the radial direction of the recording disk 200, so as to have at least one function from among a data readout function and a data writing function. Examples of the reciprocating movement operation of the recording playback head 8a according to the present embodiment include: a swinging operation, a linear reciprocating movement operation, and so forth. By covering the opening of the base member 50 (portion shown in FIG. 1) with a top cover, the internal space of the base member 50 housing the recording disk 200, the data read/write unit 8, and the bearing unit of which a detailed configuration will be described with reference to FIG. 2, and so forth, can be maintained in an airtight state.

Figure 2:
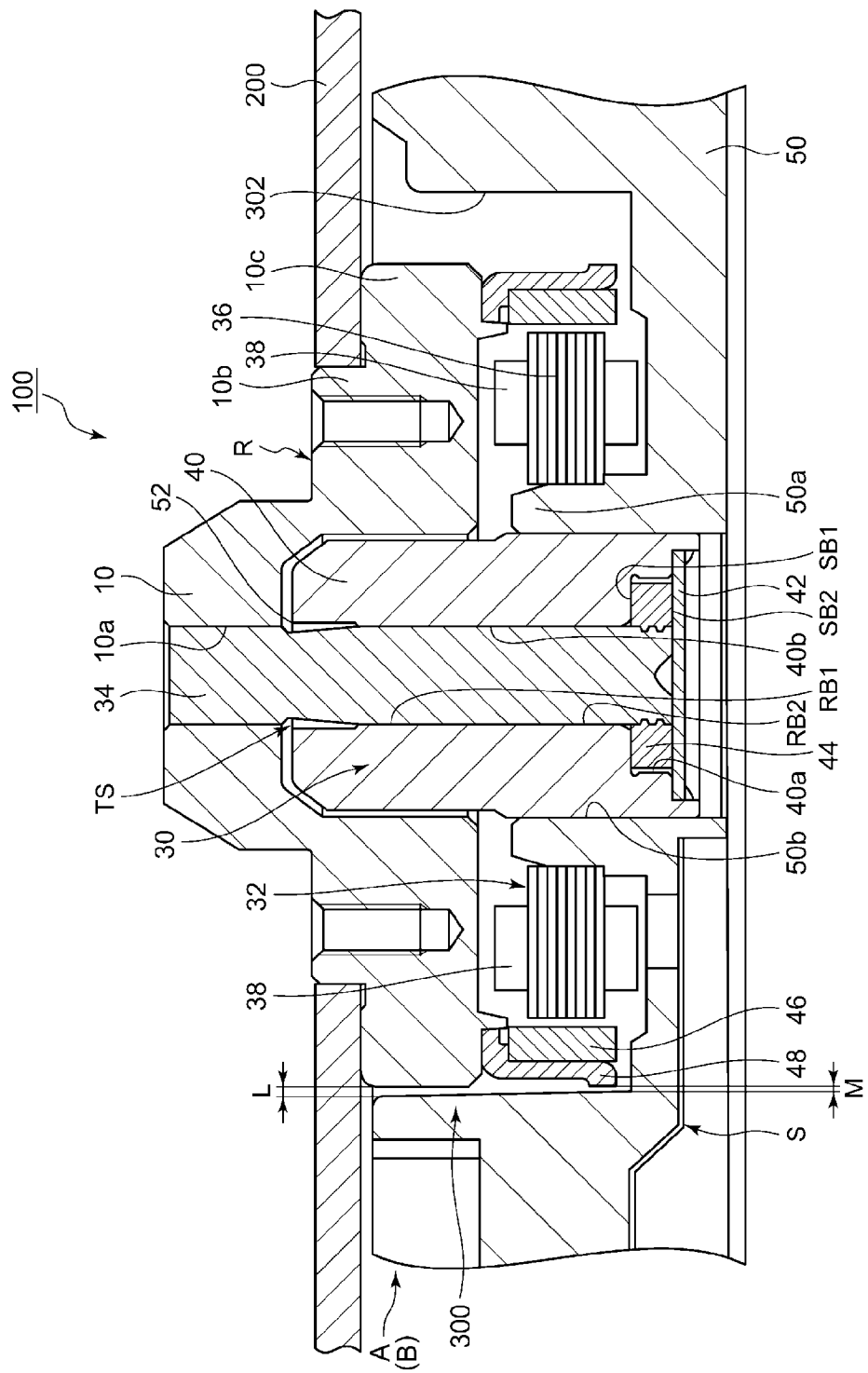
FIG. 2 is a cross-sectional diagram for describing an internal configuration focusing on a bearing unit of the disk driving apparatus shown in FIG. 1.

FIG. 2 is a cross-sectional diagram taken along line A-A in FIG. 1, for describing an internal configuration of the disk driving apparatus 100 shown in FIG. 1, focusing on the bearing unit.

As shown in FIG. 2, the disk driving apparatus 100 according to the present embodiment comprises a stator unit S, a rotor unit R, a fluid bearing unit 30 comprising a radial fluid dynamic pressure bearing unit and a thrust fluid dynamic pressure bearing unit, and a driving unit 32. The radial fluid dynamic pressure bearing unit is composed of radial dynamic pressure grooves RB1 and RB2 including a lubricant fluid 52. Moreover, the thrust fluid dynamic pressure bearing unit is composed of thrust dynamic pressure grooves SB1 and SB2 including the lubricant fluid 52. The driving unit 32 is configured to rotationally drive the rotor unit R relative to the stator unit S via the fluid dynamic pressure bearings. FIG. 2 shows a configuration of a so-called shaft-rotating disk driving apparatus 100 configured such that the hub member 10 configured to support the recording disk 200 and the shaft 34 are rotationally driven as a single unit, as an example. It should be noted that each component of the disk driving apparatus 100 is classified based on its function. In this classification, a component may be included in multiple classified groups such as the stator unit S, the bearing unit 30, the rotor unit R, and the driving unit 32, for example. For example, the shaft 34 is included in the rotor unit R, as well as being included in the bearing unit 30.

The stator unit S is configured including a base member 50, a stator core 36, a coil 38, a sleeve 40, and a counter plate 42. The stator core 36 is fixed to the outer wall of an inner cylindrical portion 50a formed on the base member 50. The sleeve 40 is configured as a cylindrical member, and is formed of a metal material or a resin material having electrical conductivity. The outer face of the sleeve 40 constitutes the outer face of the fluid bearing unit 30. The fluid bearing unit 30 is fixed by means of an adhesive agent or the like to a bearing hole 50b defined by the inner wall of the inner cylindrical portion 50a formed in the base member 50. The disk-shaped counter plate 42 is fixed to one end of the sleeve 40, which seals the interior side of the base member 50 on which the recording disk 200 or the like is to be mounted. Furthermore, an inhibiting wall 300 is formed on the outer face side of the inner cylindrical portion 50a of the base member 50, in order to inhibit the migration of the gasified lubricant fluid 52 to a clean-air space A housing the recording disk 200 and the data read/write unit 8. Detailed description will be made later regarding the inhibiting wall 300.

The base member 50 can be formed by cutting a part of a base material manufactured by means of aluminum die casting after the manufactured base material is subjected to epoxy resin surface coating, by pressing an aluminum plate, or otherwise by pressing an iron plate and performing nickel plating on the iron plate thus pressed. The stator core 36 is manufactured by stacking multiple magnetic plate members such as silicon steel plates, and by performing insulating surface coating on the magnetic plate members thus stacked by means of electrodeposition coating, powder coating, or the like. Furthermore, the stator core 36 is configured as a ring-shaped member having multiple salient poles (not shown) protruding outward along the radial direction. A coil 38 is formed at each salient pole. For example, in a case in which the disk driving apparatus 100 is configured to perform a three-phase driving operation, the number of salient poles is determined to be nine. It should be noted that the winding terminal of the coil 38 is connected to an FPC (not shown) arranged on the bottom face of the base member 50 by soldering.

The rotor unit R has a configuration including the hub member 10, the shaft 34, a flange 44, and a magnet 46. The hub member 10 is configured in an approximately cup-like shape, and includes an outer-face cylindrical portion 10b arranged concentrically around a central hole 10a, and an outer extension portion 10c extending laterally outward from the outer-face cylindrical portion 10b. Furthermore, a ring-shaped back yoke 48 having a L-shaped cross-sectional shape is formed on the lower end side of the outer extension portion 10c. Moreover, the ring-shaped magnet 46 is fixed to the inner wall of the back yoke 48. The hub member 10 can be formed by cutting a metal member formed of stainless steel, aluminum, iron, or the like. It should be noted that the hub member 10 can be formed of an electrically conductive resin by molding or machining. The magnet 46 is formed of a material such as a Nd—Fe—B (neodymium-iron-boron) system, for example, and is subjected to anti-corrosion surface processing by means of electro coating, spray coating, or the like. With the present embodiment, the magnet 46 is configured such that 12 magnetic poles are formed on the inner face thereof.

The shaft 34 is arranged such that one end thereof is fixed at the central hole 10a formed in the hub member 10, and the disk-shaped flange 44 is fixed to the other end thereof. The shaft 34 can be formed of a metal member having electrical conductivity such as a stainless steel member or the like, for example. The flange 44 can be formed of a metal material or a resin material having electrical conductivity. A flange housing space 40a for housing the flange 44 is formed at one end of the sleeve 40. Thus, the sleeve 40 is configured to rotatably support the shaft 34 to which the flange 44 is fixed, facing a space enclosed by the cylindrical inner wall 40b and the flange housing space 40a.

The shaft 34 with the flange 44, which is a component of the rotor unit R, is inserted along the cylindrical inner wall 40b of the sleeve 40 of the stator unit S. As a result, the rotor unit R is rotatably supported by the stator unit S via the radial fluid dynamic pressure bearing unit composed of the radial dynamic pressure grooves RB1 and RB2 and including the lubricant fluid 52, and a thrust fluid dynamic pressure bearing unit composed of the thrust dynamic pressure grooves SB1 and SB2 and including the lubricant fluid 52. The driving unit 32 has a configuration including the stator core 36, the coil 38, and the magnet 46. With such an arrangement, the back yoke 48, the stator core 36, and the magnet 46 form a magnetic circuit. Thus, by sequentially supplying electric power to each coil 38 by means of the control operation of an external driving circuit, such an arrangement allows the rotor unit R to be rotationally driven.

It should be noted that, with the present embodiment, the outer-face cylindrical unit 10b of the hub member 10 is configured to be engaged with the central hole of the recording disk 200, and the outer extension portion 10c is configured to support the recording disk 200 at a predetermined position. Furthermore, an unshown clamper is configured to be pressed into contact with the upper face of the recording disk 200. The clamper is fixed to the hub member 10 by a screw (not shown). In this state, the recording disk 200 is fixedly mounted on the hub member 10, which allows the recording disk 200 to be rotated together with the hub member 10.

Next, description will be made regarding the fluid bearing unit 30.

The fluid bearing unit 30 has a configuration including the shaft 34, the flange 44, the sleeve 40, and the counter plate 42. The cylindrical inner wall 40b of the sleeve 40 and the outer face of the shaft 34 that faces the cylindrical inner wall 40b constitute a radial space portion. Furthermore, the radial dynamic pressure grooves RB1 and RB2 are formed in at least one from among the cylindrical inner wall 40b of the sleeve 40 and the outer face of the shaft 34, which allows dynamic pressure to be generated so as to support the shaft 34 along the radial direction. The radial dynamic pressure groove RB1 is formed on the side nearer to the hub member 10, and the radial dynamic pressure groove RB2 is formed on the side farther from the hub member 10. The radial dynamic pressure grooves RB1 and RB2 are each configured as a herringbone groove or a spiral groove arranged separated from each other along the axis direction of the shaft 34. The space formed by the radial dynamic pressure grooves RB1 and RB2 is filled with the lubricant fluid 52 such as oil or the like. Thus, by rotating the shaft 34, such an arrangement is configured to generate a high pressure portion in the lubricant fluid 52. The pressure thus generated allows the shaft 34 to float on the surrounding wall, thereby providing a substantially contactless rotating state of the shaft 34 floating along the radial direction.

As described above, the flange 44 is fixed at the lower end of the shaft 34 such that the flange 44 is rotated together with the shaft 34 as a single unit. Furthermore, the middle portion of the bottom face of the sleeve 40 constitutes the flange housing space 40a configured to house the flange 44 such that it is rotatably supported. One end of the flange housing space 40a is sealed by the counter plate 42, which maintains the airtightness of the flange housing space 40a and the airtightness of the housing space for the shaft 34 which communicates with the flange housing space 40a.

The thrust dynamic pressure groove SB1 is formed in at least one from among the face of the flange 44 and the face of the sleeve 40 that face each other along the axis direction. Furthermore, the thrust dynamic pressure groove SB2 is formed in at least one from among of the face of the flange 44 and the face of the counter plate 42 that face each other. Such a mechanism formed of the thrust dynamic pressure grooves SB1 and SB2 including the lubricant fluid 52 functions as the thrust fluid dynamic pressure bearing unit. The thrust dynamic pressure grooves SB1 and SB2 are each configured as a spiral groove or a herringbone groove. Such an arrangement allows pump-in dynamic pressure to be generated. That is to say, by rotating the flange 44, which is a component of the rotor unit R, relative to the sleeve 40 and the counter plate 42, which are components of the stator unit S, such an arrangement generates pump-in dynamic pressure. As a result, the dynamic pressure thus generated provides a substantially contactless state of the rotor unit R including the flange 44, floating on the stator unit S along the axis direction, with a predetermined gap between the stator unit S and the rotor unit R. In this state, the rotor unit R including the hub member 10 is supported in a contactless state with respect to the stator unit S.

With the present embodiment, the lubricant fluid 52 with which the space is filled is shared by the radial fluid dynamic pressure bearing unit and the thrust fluid dynamic pressure bearing unit. The open end of the sleeve 40 forms a capillary sealing portion TS having a tapered structure configured such that the gap between the inner face of the sleeve 40 and the outer face of the shaft 34 gradually extends outward as it approaches the open end. Furthermore, the space that includes the radial dynamic pressure grooves RB1 and RB2, the space that includes the thrust dynamic pressure grooves SB1 and SB2, and a part of the capillary sealing portion TS are filled with the lubricant fluid 52. The capillary sealing portion TS is configured to prevent the lubricant fluid 52 from leaking, due to the capillary action, from the filled space to the exterior. It should be noted that the hub member 10 functions as a cover for the capillary sealing portion TS. Also, there is a gap between the stator unit S and the rotor unit R. Thus, such an arrangement requires the inhibiting wall 300 to prevent the gasified lubricant fluid 52 from migrating, and particularly from migrating to the head movement region side.

Figure 3:
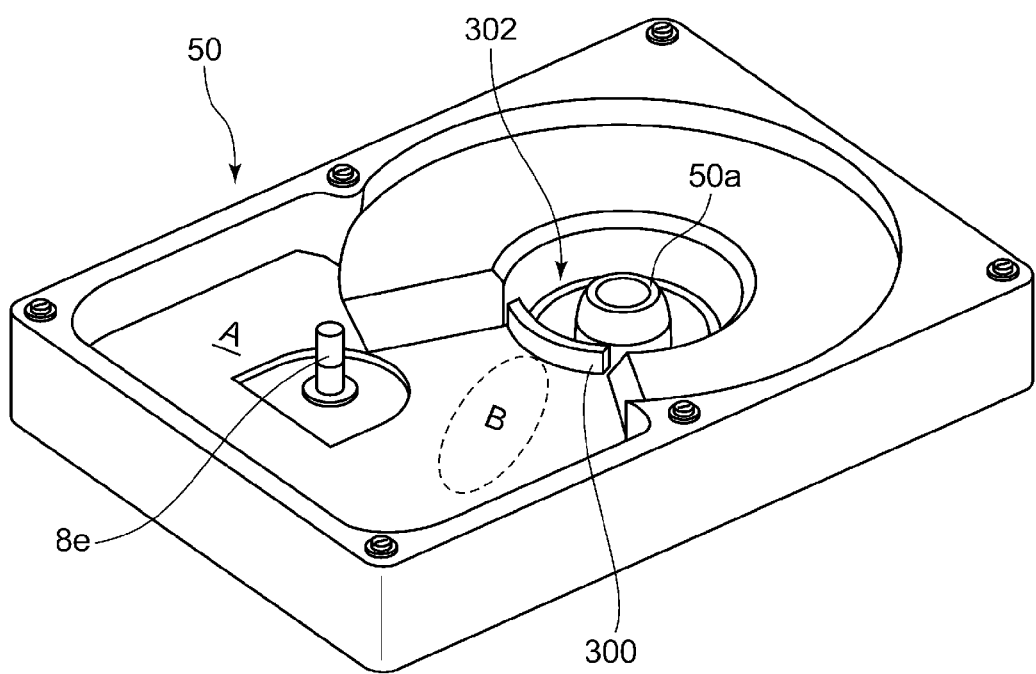
FIG. 3 is a perspective view of a base member of the disk driving apparatus including an inhibiting wall according to the present embodiment.

FIG. 3 is a perspective view of the base member 50. FIG. 3 shows the base member 50 in a state showing the clean-air space A housing the data read/write unit 8 and the recording disk 200 (see FIG. 1). A recessed housing portion 302 is formed in the central region of the clean-air space A. The recessed housing portion 302 is configured to house the rotor unit R supported by the fluid bearing unit 30 such that at least a part of the rotor unit R is surrounded by the recessed housing portion 302. In FIG. 3, the end side of the inner cylindrical portion 50a formed in the base member 50 is shown together with the recessed housing portion 302. The fluid bearing unit 30 is mounted on the inner wall face side of the inner cylindrical portion 50a, and the stator core 36 is fixed to the outer wall of the inner cylindrical portion 50a. Furthermore, a voice coil motor 8d (see FIG. 1) is arranged in the clean-air space A. Only the driving shaft 8e of the voice coil motor 8d is shown in FIG. 3.

Figure 4:
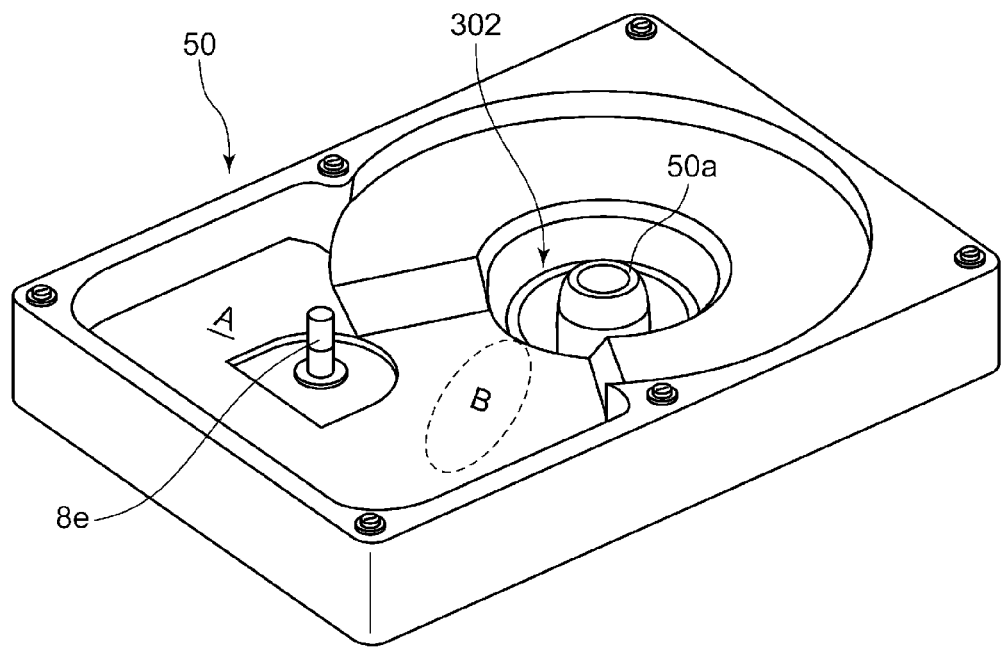
FIG. 4 is a perspective view of a base member of a disk driving apparatus having no inhibiting wall.

The clean-air space A of the base member 50 according to the present embodiment includes a head movement region B in which the recording playback head 8a of the data read/write unit 8 is mounted such that it faces the recording face of the recording disk 200 to be mounted on the hub member 10 which is a component of the rotor unit R and such that it can be moved in a reciprocating manner along the radial direction of the recording face. As described above, the lubricant fluid 52 gradually vaporizes at the gas-liquid interface of the capillary sealing portion TS into a gas at a very low rate with the passage of the operating time of the disk driving apparatus 100. The inhibiting wall 300 is formed in order to prevent the gasified lubricant fluid 52 from migrating to the clean-air space A side, i.e., the head movement region B side, via a very small gap between the rotor unit R and the base member 50. In other words, the inhibiting wall 300 is formed as a boundary between the head movement region B and the recessed housing portion 302 so as to prevent the gasified lubricant fluid 52 from migrating toward the clean-air space A side. FIG. 4 shows a comparison configuration in which the inhibiting wall 300 is not formed. With such an arrangement shown in FIG. 4, a part of the recessed housing portion 302 is notched so as to allow the recording playback head 8a configured to be moved in the head movement region B to approach as closely as possible to the inner face region of the recording disk 200. In contrast, with such a configuration shown in FIG. 3 according to the present embodiment, the inhibiting wall 300 is formed instead of the notched portion shown in FIG. 4. The inhibiting wall 300 is formed only at a part of the recessed housing portion 302 that faces the head movement region B, so as to substantially cover the notched portion. For example, the inhibiting wall 300 is formed in an arc shape. In this case, the inhibiting wall 300 is formed together with the recessed housing portion 302 so as to cover, over the radial direction, the entire area of the driving unit 32 and a part of the outer extension portion 10c of the hub member 10. Also, in another embodiment, the inhibiting wall 300 may be formed over the entire inner face of the recessed housing portion 302. As described above, the inhibiting wall 300 is formed at least a portion of the head movement region B that faces the rotor unit R such that it surrounds the outer face of the rotor unit R. It should be noted that, in some cases, as shown in FIG. 3, the "inhibiting wall 300" indicates a portion formed as a part of the recessed housing portion 302. In some cases, the "inhibiting wall 300" indicates a portion including the entire inner wall face of the recessed housing portion 302. Also, the inhibiting wall 300 may be monolithically formed together with the base member 50. Also, the inhibiting wall 300 may be formed as a separate member, and the inhibiting wall 300 thus formed may be fixedly mounted on the base member 50.

Figure 5:
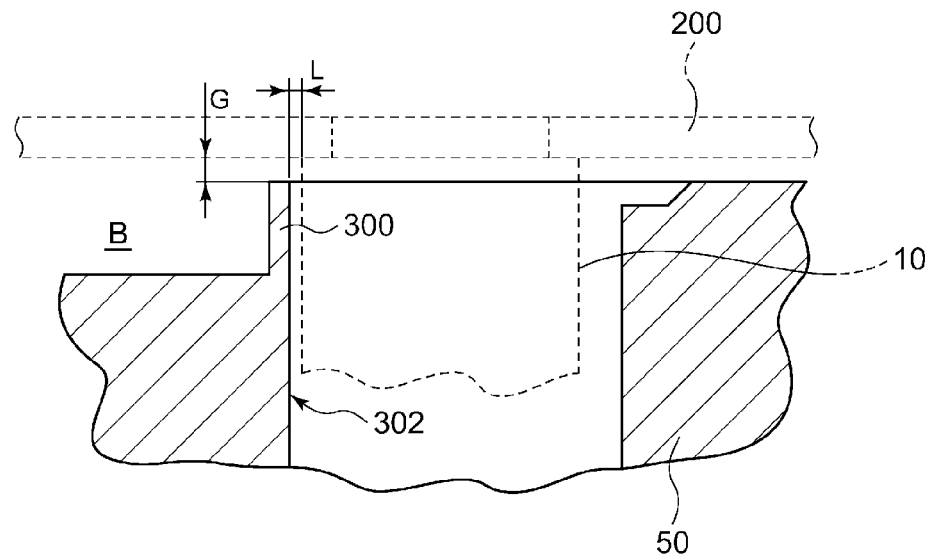
FIG. 5 is a partial cross-sectional view of the base member having the inhibiting wall included in the disk driving apparatus according to the present embodiment.

FIG. 5 is a partial cross-sectional diagram showing the base member 50 including the inhibiting wall 300. As shown in FIG. 5, the inhibiting wall 300 is monolithically formed together with the recessed housing portion 302 as if it were formed by extending the wall of the recessed housing portion 302 toward the recording disk 200 side. The inhibiting wall 300 is formed so as to continuously surround the rotor unit R (e.g., the hub member 10) together with the wall of the recessed housing portion 302. The gap G, which is defined as a gap in the rotational axis direction between the top face of the inhibiting wall 300 and the recording face of the recording disk 200 that faces the inhibiting wall 300, is preferably maintained at a uniform distance over the circumference direction of the inhibiting wall 300. In a case in which the gap G is excessively narrow, this leads to a risk of the recording disk 200 coming into contact with the inhibiting wall 300 due to vibration or shock during the operation of the disk driving apparatus 100. Conversely, in a case in which the gap G is excessively large, this leads to increased thickness of the disk driving apparatus 100 in the rotational axis direction. This leads to difficulty in forming a disk driving apparatus 100 having a thin shape and a small size. Based upon various kinds of experimental results, the present inventors have affirmed that the gap G is preferably designed to be a value ranging between 0.5 mm and 1.5 mm. By designing the gap G in this range, such an arrangement allows the disk driving apparatus 100 to be driven without involving the aforementioned problems. It should be noted that, in some cases, depending on its relationship with other components, the gap G may be varied in part along the circumference of the inhibiting wall 300. That is to say, basically, the gap G may be varied in part as long as the inhibiting wall 300 has a function of inhibiting the migration of the gasified lubricant fluid 52. It should be noted that, with such an arrangement in which the gap is varied in part, this leads to variation in the air pressure generated in the gap G. Accordingly, in some cases, such an arrangement leads to a problem of vibration of the rotor unit R. Thus, the gap G is preferably designed to be uniform. Furthermore, the gap L between the inner face of the inhibiting wall 300 and the outer face of the hub member 10 is preferably designed to be uniform in order to reduce the variation in air pressure.

Figure 6:
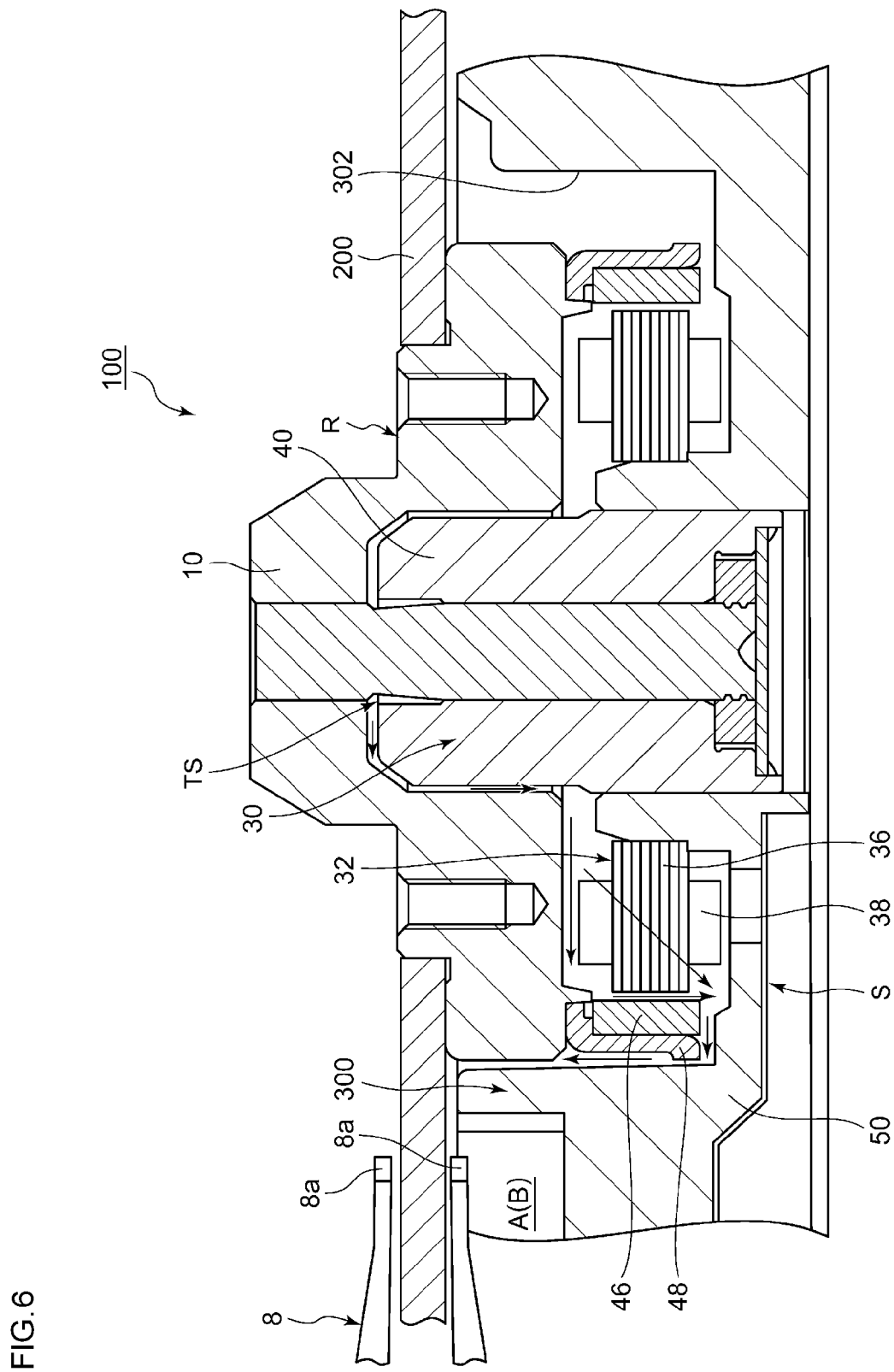
FIG. 6 is an explanatory diagram showing an example of a path through which a gasified lubricant fluid migrates in the disk driving apparatus according to the present embodiment, and showing an operation for preventing the lubricant fluid from migrating into a clean-air space.

FIG. 6 is an explanatory diagram for describing an example of a path via which the gasified lubricant fluid 52 migrates in the disk driving apparatus 100 according to the present embodiment, and a function of the inhibiting wall 300 for inhibiting the migration to the clean-air space A (head movement region B). The lubricant fluid 52 vaporizes into a gas at the gas-liquid interface of the capillary sealing portion TS, and passes through and migrates via a gap formed between the stator unit S and the rotor unit R, due to airflow or the like generated by the rotation of the rotor unit R. For example, the gasified lubricant liquid 52 migrates through a gap between the sleeve 40 and the hub member 10. Furthermore, the gasified lubricant liquid 52 passes through the interior of the driving unit 32. In this case, the gasified lubricant liquid 52 migrates through a gap between the adjacent coils 38, a gap between the coil 38 and the hub member 10, a gap between the stator core 36 and the magnet 46, a gap between the magnet 46 and the back yoke 48, and a gap between the back yoke 48 and the base member 50. Lastly, the gasified lubricant liquid 52 reaches a gap between the hub member 10 and the inhibiting wall 300. In this stage, the gasified lubricant fluid 52 adheres to the surface of each wall that defines the migration path. In particular, due to the force generated in a direction that is orthogonal to the rotational axis by the centrifugal force due to the rotation of the rotor unit R, such an arrangement allows the gasified lubricant liquid 52 to effectively collide with the inner wall of the recessed housing portion 302 and the inhibiting wall 300. That is to say, a large part of the gasified lubricant fluid 52 is blocked by the inner wall of the recessed housing portion 302 and the inhibiting wall 300. As described above, by separating the clean-air space A from the non-clean air space housing the fluid bearing unit 30 and the driving unit 32 by means of the inhibiting wall 300, such an arrangement inhibits the leakage of the gasified lubricant liquid 52. It should be noted that the outer extension portion 10c of the hub member 10, which is a part of the rotor unit R, functions as a mounting member on which the recording disk 200 is to be mounted. Furthermore, the back yoke 48 is fixed to the lower face of the outer extension portion 10c so as to form a circumferential protrusion. With the present embodiment, the gap M between the circumferential protrusion and the inhibiting wall 300 is designed to be narrower than the gap L between the mounting unit and the inhibiting wall 300 (see FIG. 2). That is to say, a flow path is narrowed at a position that is farther from the clean-air space A that corresponds to the outer extension portion 10c than the gas flow path outlet that is nearer to the clean-air space A. As a result, such an arrangement reduces the burden borne by the inhibiting wall 300 in blocking the gasified lubricant fluid 52. That is to say, the inhibiting wall 300 functions as a final blocking means for blocking the gasified lubricant fluid 52. Such a configuration is capable of greatly inhibiting the leakage of the gasified lubricant fluid 52. As shown in FIG. 2, with the distance of the gap between the inhibiting wall 300 and the hub member 10 as L, the gap distance L is designed to be a value ranging from 0.2 mm to 0.4 mm. The present inventors have obtained experimental results indicating that an arrangement in which the gap distance is designed to be 0.3 mm provides satisfactory blocking effects. It should be noted that, as shown in FIG. 6, the space housing the driving unit 32 is far greater than that of the gap between the sleeve 40 and the hub member 10 and the gap between the back yoke 48 and the base member 50. Accordingly, the gasified lubricant fluid 52 temporarily remains in the space housing the driving unit 32, and it is difficult for such remaining lubricant fluid 52 to leak to such a narrow upstream space and a narrow downstream space. In order to improve such a function, with the disk driving apparatus 100 according to the present embodiment, the lower end of the back yoke 48 is formed such that it protrudes toward the outer face direction, i.e., toward the base member 50 side, thereby narrowing the gap between the back yoke 48 and the base member 50 on the side that is farther from the data read/write unit 8. As shown in FIG. 2, with the distance of the gap between the back yoke 48 and the base member 50 as M, the gap distance M is designed to be a value ranging between 0.05 mm and 0.2 mm. The present inventors have obtained experimental results indicating that an arrangement in which M=0.15 mm provides satisfactory gas flow inhibition effects. That is to say, by designing the size of each component such as the base member 50, the back yoke 48, the hub member 10, and so forth, so as to satisfy the relation M<L, such an arrangement can be configured to greatly inhibit the leakage of the gasified lubricant fluid 52.

As described above, by providing the inhibiting wall 300, such an arrangement is capable of inhibiting the leakage of the gasified lubricant fluid 52 into the head movement region B (clean-air area A). Thus, such an arrangement is capable of suppressing the adhesion of the gasified lubricant fluid 52 or a part of a component thereof to the surface of the recording playback head 8a or the like. As a result, this reduces the change in the effective gap between the recording playback head 8a and the recording disk 200. Thus, such an arrangement reduces the risk of the occurrence of data read/write error for the recording disk 200. As a result, such an arrangement improves the life of the disk driving apparatus, i.e., a period of time during which the user can use this disk driving apparatus. Also, such an arrangement contributes to providing a large-capacity disk driving apparatus.

Figure 7:
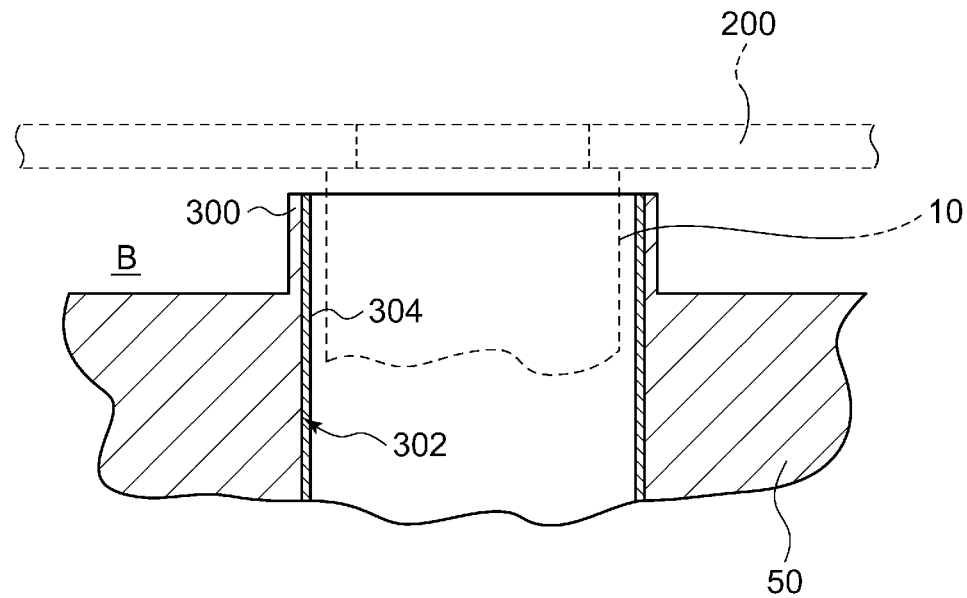
FIG. 7 is an explanatory diagram for describing an example in which a capturing mechanism is formed in the inner face of the inhibiting wall included in the disk driving apparatus according to the present embodiment.

FIG. 7 is an explanatory diagram showing another example of the inhibiting wall 300, showing an arrangement in which the inhibiting wall 300 includes a gas capturing mechanism 304 configured to capture the gasified lubricant fluid 52. FIG. 7 shows an arrangement in which the inhibiting wall 300 is formed over the region including the notched portion of the recessed housing portion 302 and the entire surface of the inner wall of the recessed housing portion 302. FIG. 7 shows an arrangement in which the gas capturing mechanism 304 is formed over the entire inner face of the inhibiting wall 300. Also, the gas capturing mechanism 304 may be formed only for a portion that faces the head movement region B that is a part of the inner face of the inhibiting wall 300. The gas capturing mechanism 304 may be formed as a porous filter, for example. By configuring the gas capturing mechanism 304 as such a porous filter, the gas capturing mechanism 304 can be configured to have an increased surface area, thereby allowing the gasified lubricant fluid 52 to be captured with high efficiency. Such a porous filter may be monolithically formed together with the inner face of the inhibiting wall 300. Also, a porous filter configured as a separate component may be fixedly mounted on the surface of the inner wall of the inhibiting wall 300. Also, the gas capturing mechanism 304 may be configured by forming multiple protrusions and recesses in the wall of the inhibiting wall 300. Such an uneven structure may be formed at the same time as the recessed housing portion 302 is processed. Otherwise, such an uneven structure may be separately formed in an additional process. Such an arrangement having such an uneven structure provides an increased surface area in the same way as with an arrangement employing a porous filter, and has an advantage that it can be configured in a simple manner. Thus, such an arrangement provides an improved gas capturing function while suppressing an increase in manufacturing costs.

As described above, in the operation of the disk driving apparatus 100, the rotor unit R is rotated relative to the stator unit S. Thus, the gasified lubricant fluid 52 is forcibly shifted toward the outer side along its circumference due to the centrifugal force generated by the rotation of the rotor unit R, whereby the gasified lubricant fluid 52 collides with the gas capturing mechanism 304. Thus, by forming the gas capturing mechanism 304 at least on the inner face of the inhibiting wall 300, such an arrangement is capable of capturing the gasified lubricant fluid 52 with high efficiency.

Figure 8:
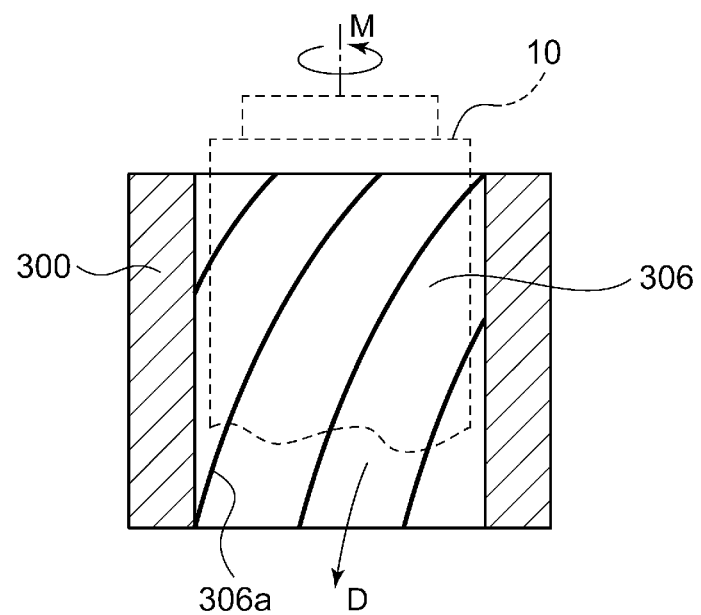
FIG. 8 is a cross-sectional diagram for describing an example in which an airflow guiding structure is formed in the inner face of the inhibiting wall included in the disk driving apparatus according to the present embodiment.
Figure 9:
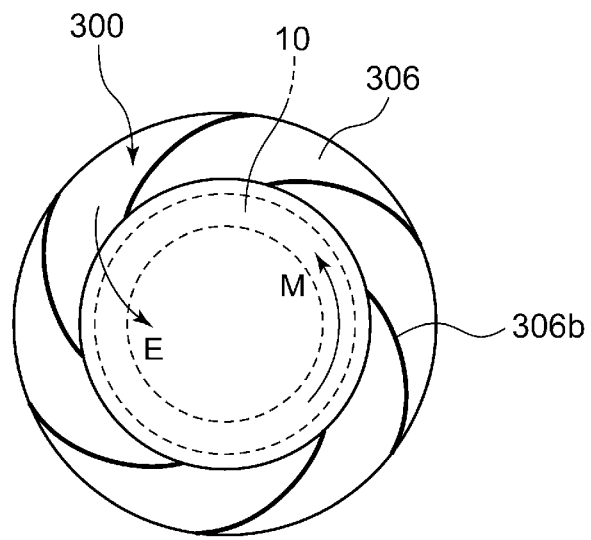
FIG. 9 is a cross-sectional diagram for describing an example in which an airflow guiding structure is formed in the upper face of the inhibiting wall included in the disk driving apparatus according to the present embodiment.

Also, as shown in FIGS. 8 and 9, the inhibiting wall 300 according to the present embodiment may include an airflow inducing member 306 configured to direct the airflow generated by the rotation of the rotor unit R, and specifically by the hub member 10 or the recording disk 200 mounted on the hub member 10, toward the inner side of the recessed housing portion 302, i.e., a non-clean-air area side. It should be noted that FIGS. 8 and 9 each show an arrangement in which the inhibiting wall 300 is formed over the entire inner face of the recessed housing portion 302 formed in the base member 50, as with an arrangement shown in FIG. 7. FIG. 8 shows an arrangement in which the airflow guiding structure 306 is formed on the cylindrical inner face of the inhibiting wall 300, and is configured as a spiral groove, for example. The spiral direction of such a spiral groove employed in such an arrangement is determined according to the rotational direction of the hub member 10 in the normal operation of the disk driving apparatus 100. By rotating the hub member 10 in the arrow M direction, the gasified lubricant fluid 52 is guided by the spiral groove 306a toward the arrow D direction, i.e., toward the lower side of the base member 50. As a result, such an arrangement is capable of further reducing the amount of the gasified lubricant fluid 52 that flows toward the clean-air space A side. As a similar example, FIG. 9 shows an arrangement in which the airflow guiding structure 306 is formed in the upper face of the inhibiting wall 300, i.e., in the face that faces the recording face of the recording disk 200. With such an arrangement, by rotating the hub member 10 in the arrow M direction, the gasified lubricant fluid 52 is guided by the spiral groove 306b toward the arrow E direction, i.e., toward the inner side of the inhibiting wall 300. As a result, such an arrangement is capable of further reducing the amount of the gasified lubricant fluid 52 that flows toward the clean-air space A side. It should be noted that the airflow guiding structure 306 is not restricted to such a spiral groove. Also, the airflow guiding structure may be configured as a protruding structure or a fin-shaped structure. Also, the airflow guiding structure 306 may be configured as a slope.

If the gasified lubricant fluid 52 flows into the clean-air space A side, a part of the lubricant fluid 52 adheres to the recording face of the recording disk 200. This leads to discoloration of the recording face, which becomes a cause of quality degradation. By inhibiting the leakage of the gasified lubricant fluid 52 as described above, such an arrangement provides an advantage of suppressing adverse effects on the recording disk 200.

It should be noted that the inhibiting wall 300 configured as shown in FIG. 3 leads to a problem in that the recording playback head 8a (see FIG. 1) cannot approach the inner face side of the recording disk 200 as compared with an arrangement in which such an inhibiting wall 300 is not formed on the inner face side of the recording disk 200 as shown in FIG. 4. However, by providing a simple countermeasure, such as forming the inhibiting wall 300 at a position that corresponds to the non-recording area of the recording disk 200, configuring the recording disk 200 to have improved track density, or the like, such an arrangement is capable of compensating for a reduction in the recording capacity due to the inhibiting wall 300 which prevents the recording playback head 8a from approaching the inner face side of the recording disk 200.

Description has been made above as an example regarding the rotating-shaft disk driving apparatus 100. Also, the present invention is applicable to a stationary-shaft disk driving apparatus, which provides the same advantages.

Description has been made above regarding the disk driving apparatus according to the embodiment. It is needless to say that the aforementioned embodiments show only the mechanisms and applications of the present invention for exemplary purposes only, and are by no means intended to be interpreted restrictively. Rather, it can be readily conceived by those skilled in this art that various modifications and various changes in the layout can be made without departing from the spirit and scope of the present invention defined in appended claims.

What is claimed is:

1. A disk driving apparatus configured to mount a head unit for performing at least reading or writing of data from or onto a recording disk, comprising:
    a base member;
    a rotor unit on which the recording disk is to be mounted;
    a fluid bearing unit configured to be filled with a lubricant fluid and produce a dynamic pressure in the lubricant fluid so as to rotatably support the rotor unit relative to the base member;
    a driving unit configured to include a coil and a magnet and rotationally drive the rotor unit relative to the base member; and
    a head movement region in which the head unit is to be mounted in a movable manner,
    wherein a gas-liquid interface of the lubricant fluid communicates with the head movement region via a gap in the driving unit, and
    wherein a capturing mechanism is provided in a path that communicates with the gap in the driving unit and the head movement region.

2. The disk driving apparatus according to claim 1, wherein the capturing mechanism is provided on a surface of the base member that faces the rotor unit.

3. The disk driving apparatus according to claim 2,
    wherein the base member has a recessed housing portion surrounding at least a part of the rotor unit, and
    wherein the capturing mechanism is arranged on an inner wall of the recessed housing portion.

4. The disk driving apparatus according to claim 3,
    wherein the capturing mechanism is formed on an entire surface of the inner wall of the recessed housing portion.

5. The disk driving apparatus according to claim 3,
    wherein the capturing mechanism represents a plurality of concavities and convexities provided on the inner wall of the recessed housing portion.

6. The disk driving apparatus according to claim 3,
    wherein a ring-shaped stator core having a salient pole protruding outwards in a radial direction is fixed to the base member while the coil is wound around the salient pole of the stator core,
    wherein the rotor unit has a hub on which the recording disk is mounted, a ring-shaped back yoke that is fixed on a side of the base member of the hub, and the magnet that is fixed on a side of an inner circumference of the back yoke and that surrounds the stator core, and wherein the back yoke has a protrusion protruding outwards in the radial direction on an end portion on a side opposite to the hub.

7. The disk driving apparatus according to claim 6, wherein a gap between the protrusion of the back yoke and the inner wall of the recessed housing portion in the radial direction is 0.05 to 0.2 mm.

8. The disk driving apparatus according to claim 1,
wherein the fluid bearing unit has a shaft and a sleeve surrounding the shaft,
wherein the gas-liquid interface of the lubricant fluid is located between an inner circumference of the sleeve and an outer circumference of the shaft, and
wherein the rotor unit surrounds an outer circumference of an end portion of the sleeve, the end portion being on a side on which the gas-liquid interface exists.

9. The disk driving apparatus according to claim 1, wherein the capturing mechanism is a porous body.

10. The disk driving apparatus according to claim 9,
wherein the base member has a recessed housing portion surrounding at least a part of the rotor unit, and
wherein the capturing mechanism is arranged on an inner wall of the recessed housing portion.

11. The disk driving apparatus according to claim 10, wherein the capturing mechanism is a body separate from the base member and is fixed to a surface of the inner wall of the recessed housing portion.

12. A disk driving apparatus configured to mount a head unit for performing at least reading or writing of data from or onto a recording disk, comprising:
a base member;
a rotor unit on which the recording disk is to be mounted;
a fluid bearing unit configured to be filled with a lubricant fluid and produce a dynamic pressure in the lubricant fluid so as to rotatably support the rotor unit relative to the base member;
a driving unit configured to include a coil and a magnet and rotationally drive the rotor unit relative to the base member; and
a head movement region in which the head unit is to be mounted in a movable manner,
wherein a gas-liquid interface of the lubricant fluid communicates with the head movement region via a gap in the driving unit, and
wherein an airflow guiding structure is provided in a path that communicates with the gap in the driving unit and the head movement region.

13. The disk driving apparatus according to claim 12, wherein the airflow guiding structure is provided on a surface of the base member that faces the rotor unit.

14. The disk driving apparatus according to claim 13,
wherein the base member has a recessed housing portion surrounding at least a part of the rotor unit, and
wherein the airflow guiding structure is arranged on an inner wall of the recessed housing portion.

15. The disk driving apparatus according to claim 14, wherein the airflow guiding structure is formed on an entire surface of the inner wall of the recessed housing portion.

16. The disk driving apparatus according to claim 14,
wherein a ring-shaped stator core having a salient pole protruding outwards in a radial direction is fixed to the base member while the coil is wound around the salient pole of the stator core,
wherein the rotor unit has a hub on which the recording disk is mounted, a ring-shaped back yoke that is fixed on a side of the base member of the hub, and the magnet that is fixed on a side of an inner circumference of the back yoke and that surrounds the stator core, and
wherein the back yoke has a protrusion protruding outwards in the radial direction on an end portion on a side opposite to the hub.

17. The disk driving apparatus according to claim 16, wherein a gap between the protrusion of the back yoke and the inner wall of the recessed housing portion in the radial direction is 0.05 to 0.2 mm.

18. The disk driving apparatus according to claim 12,
wherein the fluid bearing unit has a shaft and a sleeve surrounding the shaft,
wherein the gas-liquid interface of the lubricant fluid is located between the inner circumference of the sleeve and the outer circumference of the shaft, and
wherein the rotor unit surrounds an outer circumference of an end portion of the sleeve, the end portion being on a side on which the gas-liquid interface exists.

19. The disk driving apparatus according to claim 12, wherein the airflow guiding structure is a spiral-shaped groove.

20. The disk driving apparatus according to claim 12, wherein a capturing mechanism is provided in a path that communicates with the gap in the driving unit and the head movement region.

* * * * *